(12) United States Patent
Kirollos et al.

(10) Patent No.: US 12,533,066 B2
(45) Date of Patent: Jan. 27, 2026

(54) PRESSURE MEASUREMENT DEVICE

(71) Applicant: HEAVISIDE LTD, Torquay (GB)

(72) Inventors: Benjamin William Mounir Kirollos, Torquay (GB); Vikram Sridhar, Torquay (GB)

(73) Assignee: HEAVISIDE LTD, Torquay (GB)

( * ) Notice: Subject to any disclaimer, the term of this patent is extended or adjusted under 35 U.S.C. 154(b) by 901 days.

(21) Appl. No.: 17/774,387

(22) PCT Filed: Nov. 5, 2020

(86) PCT No.: PCT/GB2020/052804
§ 371 (c)(1),
(2) Date: May 4, 2022

(87) PCT Pub. No.: WO2021/090009
PCT Pub. Date: May 14, 2021

(65) Prior Publication Data
US 2022/0361792 A1    Nov. 17, 2022

(30) Foreign Application Priority Data

Nov. 6, 2019 (GB) ..................... 1916125

(51) Int. Cl.
*A61B 5/20* (2006.01)
*A61B 5/00* (2006.01)

(52) U.S. Cl.
CPC ............ *A61B 5/205* (2013.01); *A61B 5/6834* (2013.01)

(58) Field of Classification Search
None
See application file for complete search history.

(56) References Cited

U.S. PATENT DOCUMENTS 4,554,687 A * 11/1985 Carter .................. A61B 5/208
4/144.1
4,696,672 A    9/1987 Mochizuki et al.
(Continued)

FOREIGN PATENT DOCUMENTS

DE    19619567 A1    11/1997
EP    0370557 A1    5/1990
(Continued)

OTHER PUBLICATIONS

Notification of Transmittal (Form PCT/ISA/220), International Search Report (Form PCT/ISA/210), and Written Opinion (Form PCT/ISA/237) for International Application No. PCT/GB2020/052804 mailed Feb. 19, 2021, 12 pages.
(Continued)

*Primary Examiner* — Aurelie H Tu
(74) *Attorney, Agent, or Firm* — Withrow + Terranova, PLLC; Vincent K. Gustafson (57) ABSTRACT

A bladder pressure measurement device comprises a conduit for receiving a flow of urine, a valve actuatable between a first open configuration and a second restricted configuration, a pressure sensor, upstream of the valve and arranged to measure the pressure of the flow of urine through the conduit, and a data recorder and/or a data transmitter. The pressure sensor obtains a first measurement when the valve is in the first open configuration and a second measurement when the valve is in the second restricted configuration. The data recorder and/or transmitter records or transmits data representative of the first and second measurements.

13 Claims, 6 Drawing Sheets

(56) References Cited

U.S. PATENT DOCUMENTS

| | | | |
|---|---|---|---|
| 4,790,194 A | 12/1988 | Bellows et al. | |
| 5,108,382 A | 4/1992 | Wright et al. | |
| 5,377,101 A | 12/1994 | Rollema | |
| 5,616,138 A | 4/1997 | Propp | |
| 5,807,278 A | 9/1998 | McRae | |
| 5,823,972 A | 10/1998 | McRae | |
| 6,053,055 A | 4/2000 | Nelson | |
| 6,506,169 B2 | 1/2003 | Griffiths | |
| 6,805,662 B2 | 10/2004 | Shah et al. | |
| 9,277,884 B2 | 3/2016 | Kron et al. | |
| 9,636,067 B2 | 5/2017 | Kron et al. | |
| 9,675,295 B2 | 6/2017 | Kron et al. | |
| 2004/0260163 A1 | 12/2004 | Kron et al. | |
| 2008/0114316 A1* | 5/2008 | Christensen | A61B 5/412 604/323 |
| 2011/0125061 A1 | 5/2011 | Shahar et al. | |
| 2021/0000361 A1* | 1/2021 | Lark | A61B 5/208 |

FOREIGN PATENT DOCUMENTS

| | | |
|---|---|---|
| EP | 2432396 B1 | 8/2017 |
| WO | 03024330 A2 | 3/2003 |
| WO | 03087642 A1 | 10/2003 |
| WO | 2006060185 A1 | 6/2006 |
| WO | 2013117570 A1 | 8/2013 |
| WO | 2014131097 A1 | 9/2014 |

OTHER PUBLICATIONS

Search Report under Section 17(5) for United Kingdom Patent Application No. GB1916125.6 dated Apr. 21, 2020, 4 pages.

D'Ancona, C.A.L, et al., "New Method for Minimally Invasive Urodynamic Assessment in Men with Lower Urinary Tract Symptoms", Urology 71 (1), pp. 75-78, 2008.

SRS Medical Systems, Inc., "Principles of the UroCuff Test" [retrieved on May 4, 2022] Retrieved from the Internet :<URL:https://www.srsmedical.com/wp-content/uploads/2018/05/Principles-of-the-UroCuff-Test.pdf>, 23 pages.

MediPlus Ltd., "CT3000—Non-Invasive Bladder Analysis for Men," Feb. 2008 [retrieved on May 4, 2022], Retrieved from the Internet:<URL:https://www.sunmedical.it/wp-content/uploads/2019/09/CT3000_Brochure.pdf>, 6 pages.

* cited by examiner

PRESSURE MEASUREMENT DEVICE

This application is a 35 U.S.C. § 371 national phase filing of International Application No. PCT/GB2020/052804, filed on Nov. 5, 2020, and claims the benefit of United Kingdom Patent Application No. 1916125.6 filed on Nov. 6, 2019, wherein the entire contents of the foregoing applications are hereby incorporated by reference herein.

The present invention relates to a pressure measurement device, in particular to a non-invasive urodynamic device.

Bothersome lower urinary tract symptoms (LUTS) occur in approximately 30% of men older than 65 years. LUTS are the fourth most common reason for medical consultation among older men. This large group of men potentially require treatment. These symptoms (LUTS) include excessive frequency of urination (during the night and/or day), excessive urgency of urination, difficulty in voiding, poor urinary flow rate and incomplete emptying of the bladder. This can be further complicated by urinary tract infections (UTIs), urinary retention or renal impairment. Therefore, LUTS often significantly reduce the sufferer's quality of life.

LUTS are not cause specific. Determining the underlying cause of the presenting LUTS is necessary to develop an effective treatment strategy, and the burden is often shared between primary (e.g. GP) and secondary (e.g. specialist) care.

Accurate diagnosis of the cause requires data concerning bladder pressure, i.e. intravesical pressure, as well as flow rate. Although this is applicable to every case, the collection of this data is currently often limited to a select number of patients, as the existing methods are time-consuming and expensive. For example, the NHS spends an estimated £200-400 million per year diagnosing the causes of LUTS. Existing methods are also often invasive and uncomfortable for the patient.

Although attempts have been made to develop non- or minimally-invasive methods for determining bladder pressure and urine flow, such prior art devices are often inaccurate and imprecise.

It is therefore an object of the invention to provide an improved bladder pressure measurement device.

When viewed from a first aspect, the invention provides a bladder pressure measurement device comprising:
 a conduit for receiving a flow of urine;
 a valve actuatable between a first open configuration and a second restricted configuration that restricts the flow of urine through the conduit;
 a pressure sensor upstream of the valve, wherein the pressure sensor is arranged to obtain a first measurement of the pressure of the flow of urine through the conduit when the valve is in the first open configuration and to obtain a second measurement of the pressure of the flow of urine through the conduit when the valve is in the second restricted configuration; and
 a data recorder and/or a data transmitter for recording and/or transmitting data representative of the first and the second measurements.

When viewed from a second aspect, the invention provides a method of operating a bladder pressure measurement device, the device comprising:
 a conduit for receiving a flow of urine;
 a valve actuatable between a first open configuration and a second restricted configuration that restricts the flow of urine through the conduit;
 a pressure sensor upstream of the valve, wherein the pressure sensor is arranged to measure the pressure of the flow of urine through the conduit;
the method comprising:
 actuating the valve between the first open configuration and the second restricted configuration;
 obtaining from the pressure sensor a first measurement of the pressure of the flow of urine through the conduit when the valve is in the first open configuration;
 obtaining from the pressure sensor a second measurement of the pressure of the flow of urine through the conduit when the valve is in the second restricted configuration; and
 recording and/or transmitting data representative of the first and the second measurements.

The present invention provides a bladder pressure measurement device that is used to determine the pressure in a flow of urine and/or the pressure of urine in the bladder of a user. The device includes a conduit for receiving a flow of urine, from a male or female user of the device. The device also includes a valve that is operable to be actuated between a first open configuration and second restricted (e.g. closed or partially closed) configuration. In the second restricted configuration, the valve restricts the flow of urine through the conduit (i.e. compared to the flow of urine through the conduit when the valve is in the first open configuration). Thus preferably the valve is positioned in the conduit, e.g. defining a first portion of the conduit (upstream of the valve) and a second portion of the conduit (downstream of the valve).

Preferably (e.g. the first portion of) the conduit comprises a substantially unobstructed (e.g. and linear) portion upstream of the valve such that the flow of urine through the conduit is substantially undisturbed (e.g. fully developed and axisymmetric) within this portion of the conduit. In some embodiments, the length of the substantially unobstructed portion is at least twenty times the diameter of the conduit. This can help to ensure that the restriction to the flow provided by the valve is capable of being precisely and repeatably controlled.

The device further includes a pressure sensor, arranged upstream of the valve (e.g. in the (e.g. first upstream portion of the) conduit). The pressure sensor is arranged to measure the pressure of the flow of urine through the conduit. In particular, the pressure sensor is arranged to obtain measurements of the pressure when the valve is in each of its configurations. In some embodiments, the device further includes a pressure sensor arranged downstream of the valve, which is arranged to measure the pressure (e.g. of the flow of urine or the air pressure) in the conduit downstream of the valve. This enables the pressure differential across the valve to be determined when the downstream pressure is not known (e.g. when it is not atmospheric pressure). Data representative of these pressure measurements are transmitted and/or recorded using a data transmitter and/or recorder of the device. This data may be processed in order to determine a value or indication representative of the user's bladder pressure.

Thus, by restricting the flow of urine through the conduit by actuating the valve and measuring the resultant change in the upstream pressure, the bladder pressure of a user and/or a flow rate or flow resistance of the user's urinary system (i.e. urethra and sphincters) may be determined.

It will be appreciated that the device thus allows pressure measurements corresponding to (e.g. accurately) defined flow restrictions to be taken, e.g. at high frequency and with little additional restriction. This helps both to improve the reliability and the accuracy of the measurements, compared to conventional devices. This is because, in at least preferred embodiments, the device produces limited back pressure in the conduit, which can distort pressure measurements owing to the body's response to strain against an external pressure. The reduction in back pressure also helps to increase the comfort of the user during use of the device.

The device may further comprise an adaptor for receiving a body part (e.g. penis or vagina) of a user of the device. The adaptor may be arranged to establish fluid communication between the urethra of the user and an upstream end of the conduit. The adaptor is preferably non-invasive. This means that, in contrast to many state of the art devices, invasive procedures, such as the insertion of a catheter, are not required and that the device may be used in the user's own home, rather than in a clinical, e.g. hospital, setting. This can significantly improve the user's comfort when using the device.

The adaptor may comprise a seal for substantially sealing with the body part of the user. This helps to ensure that there is no leakage of urine to the environment while the user is urinating.

In some embodiments the adaptor comprises a chamber, defined by an inner perimeter of the adaptor. The seal may extend around the inner perimeter of the adaptor (e.g. around the chamber). The (e.g. chamber of the) adaptor may be arranged to surround or to receive the body part of the user. In some embodiments, the (e.g. chamber of the) adaptor is conical.

In some embodiments, the conduit comprises a substantially vertical portion and a substantially horizontal portion (e.g. when the device is in use). The substantially vertical portion may be upstream of the substantially horizontal portion. The substantially horizontal portion of the conduit may extend directly from a downstream end of the substantially vertical portion. The substantially vertical portion and the substantially horizontal portion may be substantially perpendicular to each other. This means that the flow of urine through the horizontal portion does not have a substantial gravitational head difference across the horizontal portion, thereby allowing the bladder pressure of the user to be more accurately determined.

The substantially vertical portion of the conduit may not extend solely vertically, but may have a horizontal component. Preferably, the substantially vertical portion simply extends in a primarily vertical direction (e.g. in use). The substantially horizontal portion of the conduit may have a vertical component. However, in preferred embodiments, the horizontal portion does not have a vertical component.

In some embodiments, the (e.g. vertical portion of the) conduit is extendable. The adaptor may be arranged at an upstream end of the extendable portion. This means that the flow of urine is directed from the adaptor into the extendable portion directly. The length of the extendable portion may be lengthened or shortened, e.g. by the user of the device.

Preferably the extendable portion is substantially vertical. It will be appreciated that the term 'vertical' is intended to be understood as the axis along which urine will fall as a result of gravity. The extendable portion of the conduit may comprise a telescopic arrangement. It may comprise a bellows arrangement.

In some embodiments, the device comprises a first position sensor. The first position sensor may be arranged to measure or determine the vertical distance between the horizontal portion of the conduit and the upstream end of the vertical portion of the conduit. The first position sensor may comprise a differential pressure sensor configured to determine a change in pressure in the conduit between the vertical portion of the conduit and the horizontal portion of the conduit. The first position sensor may be configured to determine a change in head (i.e. the energy in the fluid owing to its elevation) between the vertical portion of the conduit (e.g. from the change in pressure in the conduit between the vertical portion of the conduit and the horizontal portion of the conduit). Thus, the first position sensor may be arranged to provide the change in height of a flow of urine when a user urinates into the device. This may be used to determine the total pressure head of the flow, which may then be used to determine the bladder pressure of a user and/or a flow rate or flow resistance of the user's urinary system, as discussed in more detail below.

The valve (and, e.g., the substantially linear portion of the conduit) may be arranged in the horizontal portion of the conduit. In the first open configuration, the valve may be arranged such that the flow of urine through the conduit is substantially unrestricted. In the second restricted configuration, the valve may be arranged such that the flow of urine through the conduit is at least partially prevented. In the second restricted configuration, the valve may be arranged (e.g. fully closed) such that the flow is fully prevented. Preferably the valve is configured such that the flow of urine through the valve is axisymmetric (e.g. in both first open configuration and the second restricted configuration). This can help to improve the accuracy of pressure and flow measurements obtained using the device.

In the first open configuration, the valve may be arranged such that the flow of urine through the conduit is restricted to a minimum extent (e.g. fully open such that the valve aperture has substantially the same cross section as the conduit). In the second restricted configuration, the valve may be arranged such that the flow of urine through the conduit is restricted to a maximum extent (e.g. fully closed). Preferably however, in the second configuration, the valve is only restricted by the minimum amount necessary to provide a precise measurement of bladder pressure. This can help to reduce the back pressure through the device, allowing a more accurate indication of bladder pressure to be determined and avoiding discomfort for the user.

The valve may be actuatable between a plurality of further configurations. In each further configuration, the valve may be arranged to restrict the flow of urine to a greater or lesser extent. Actuating the valve between a greater number of configurations helps to reduce statistical uncertainty in the obtained data.

The valve may be arranged to be repeatedly actuated between the first and the second configurations, e.g. with a substantially regular frequency. The frequency may be greater than 0.1 Hz, e.g. greater than 0.5 Hz, e.g. approximately 1 Hz.

In some embodiments, the valve is configured to remain in the first open configuration for a first period of time. The valve may be configured to remain in the second configuration for a second period of time. The valve may be configured to be actuatable between the first and the second configurations according to a particular (e.g. predetermined) ratio (of the first and second periods of time).

In some embodiments, the duration of the first period of time is (e.g. predetermined to be) longer than the duration of second period of time. This may be done to minimise the amount of time that the flow of urine through the conduit is restricted, thereby reducing the back pressure caused by the restriction of the flow of urine through the conduit. Thus, in some embodiments, the ratio of the time the valve is configured to remain in the first and second configurations is between 55:45 and 95:5, e.g. 65:35 and 85:15, e.g. 80:20.

The valve may be actuatable to restrict the flow through the conduit over time according to a restriction profile. The restriction profile may be used to determine (e.g. prescribe) the first period of time and the second period of time. It may prescribe the frequency with which the valve is actuated between the first and the second configuration, and/or the manner with which the valve is actuated to restrict the flow of fluid through the conduit over time. The valve may be actuatable according to any suitable or desired restriction profile.

In some embodiments, the valve is actuatable between the first open configuration and the second restricted configuration directly, e.g. according to a stepped restriction profile. Thus, in such a set of embodiments, the valve is actuatable to abruptly restrict and unrestrict the flow through the conduit. In some embodiments, the valve is smoothly actuatable between the first open configuration and the second restricted configuration, e.g. according to a sinusoidal restriction profile In some embodiments, the valve is actuatable according to a triangular restriction profile. In some embodiments, the valve is actuatable according to a trapezoidal restriction profile. In some embodiments, the valve is actuatable according to a restriction profile that is a combination of two or more waveforms, e.g. a combination of two or more of the waveforms disclosed herein. For example, the restriction profile could comprise a sine in the upper half and a triangular or square wave in the lower half. The restriction profile may define a settling time (e.g. of around 0.1 s) in each configuration. This can help to remove unsteady effects caused by actuation of the valve.

In some embodiments, the restriction profile of the valve is predetermined. In some embodiments, the device is configured to determine the restriction profile while the device is being used. The device may be configured to update the restriction profile of the device, e.g. substantially in real-time. This allows the valve to operate according to a restriction profile that is optimised for the user. This also allows the valve to operate so as to maintain pressure conditions across the valve that are more optimal for flow and pressure measurement. The restriction profile may be updated according to any number of suitable or desired parameters. In some embodiments, the restriction profile is determined using the first and/or second measurements. In some embodiments, the restriction profile is determined according to the time of day. It may be determined according to the age of the user.

The valve may comprise an iris control valve. The iris control valve may comprise a plurality of overlapping leaves, together defining a substantially circular aperture. The plurality of overlapping leaves may be movable such that actuation of the valve causes the plurality of overlapping leaves to concentrically converge or diverge. This respectively reduces or widens the circular aperture in order to control the restriction of the flow of urine through the conduit. Using an iris valve can help to ensure that the flow through the valve is axisymmetric.

The valve may comprise an armature, operable to actuate the valve between the first open configuration and the second restricted configuration. The armature may be pivotally operable in a plane substantially perpendicular to the axis of the conduit, e.g. the flow of urine. The valve may comprise a sealing sleeve, arranged on an outer perimeter of the valve to provide a seal between the flow of urine and the environment (external to the device). The sealing sleeve may define a hole through which the armature is arranged to extend (e.g. radially). The sealing sleeve may be arranged to move (e.g. rotate) perimetrically (e.g. azimuthally) with the armature when the valve is actuated.

The device may further comprise a vacuum pump. The vacuum pump may be arranged to provide a reduced pressure (e.g. a vacuum) in the conduit, e.g. to evacuate air from the conduit.

This may be done before use of the device in order to remove air bubbles before the flow of urine commences. This helps to ensure that the flow of urine through the conduit is uniform, which enables the bladder pressure of the user to be determined more accurately.

Alternatively or additionally, the vacuum pump may be arranged to provide a suction force in the adaptor of the device. This helps to ensure that a tight seal is formed between the body part of the user and the adaptor, thereby reducing any leakage of urine to the environment and to help to provide a single communicable column of fluid between the valve and the bladder (which, in turn, helps to obtain a more reliable pressure measurement). In some embodiments, the device further comprises a vacuum pressure sensor arranged to measure the reduced pressure (e.g. of a vacuum) provided by the vacuum pump. Measurements from the vacuum pressure sensor may be used to determine whether the conduit has been sufficiently evacuated. The measurements may be used to determine whether a suitable seal has been formed between the user and the adaptor.

The device may comprise an actuator for actuating the valve between the first open configuration and the second restricted configuration. The actuator may be arranged to operate the armature of the valve to actuate the valve between the first open configuration and the second restricted configuration.

The actuator may comprise a linear actuator. The actuator may comprise a linearly moveable piston. A distal end of the linear actuator (e.g. piston) may be adjoined to the armature of the valve such that linear movement of the linear actuator (e.g. piston) is translated into pivotal movement of the armature.

The actuator may comprise a stepper motor. The actuator may comprise a servo motor. Using a stepper motor or a servo motor can help to set the position of the valve quickly, precisely and repeatably. This is particularly advantageous for embodiments of the invention in which the valve is arranged to be actuated between the first open configuration and the second restricted configuration repeatedly, e.g. at a substantially regular frequency. Furthermore, this can improve the accuracy and reliability of flow and pressure measurements obtained using the device.

The actuator may comprise a shaft, rotatable by the actuator. The actuator may comprise a screw, rotatable by the actuator, and a nut, threaded on the shaft of the screw and linearly moveable, by the rotation of the screw. The nut may be adjoined to the armature of the valve such that the linear movement of the nut is translated into pivotal movement of the armature.

The device may comprise a gear mechanism for translating rotational movement of (e.g. the shaft of) the actuator into rotational movement of the valve (e.g. to open or close the valve). The valve may comprise one or more teeth positioned around a (e.g. portion of a) perimeter (e.g. circumference) of the valve. The (e.g. shaft of the) actuator may comprise one or more teeth arranged to interlock with the one or more teeth such that rotation of the (e.g. shaft of the) actuator acts to move the valve (e.g. to open or close the valve).

The (e.g. shaft or screw of the) actuator may be arranged to be parallel to the plane of the valve aperture. The (e.g.

shaft or screw of the) actuator may be arranged to be perpendicular to the plane of the valve aperture. A longitudinal axis of the (e.g. shaft or screw of the) actuator may be coaxial with the axis of the conduit.

The actuator may be arranged to actuate the valve according to a restriction profile.

The device may comprise a second position sensor arranged to measure the extent to which the valve acts to restrict the flow of urine through the conduit (e.g. the (reduction in) diameter of the valve). The device may be arranged to use this measurement to determine an indication of the flow rate of the urine through the valve. This indication can be used to determine the bladder pressure of a user and/or the flow resistance of the user's urinary system, as discussed in more detail below.

In some embodiments, the measurement obtained by the second position sensor is used to determine whether the valve is operating as intended. The measurement may be used to determine whether (or how accurately) the movement of the valve corresponds to the restriction profile. The second position sensor may be configured to obtain a sequence of measurements indicative of the extent to which the valve acts to restrict the flow of urine through the conduit (e.g. the (reduction in) diameter of the valve. The second position sensor may be configured to correlate the sequence of measurements with template data representative of an expected sequence of measurements corresponding to the restriction profile. The second position sensor may be configured to determine how strongly the sequence of measurements correlates with the template data. This can be used to determine whether the valve is being operated as intended (i.e. according to the desired restriction profile).

The second position sensor may comprise an (e.g. linear or rotary) encoder. In some embodiments the second position sensor is arranged on the valve. In some embodiments, the second position sensor is arranged on the actuator.

The pressure sensor may be arranged such that, in use, it is exposed to the flow of urine. In some embodiments, the pressure sensor may be positioned out of the direct flow of the fluid. This positioning is advantageous as it reduces the presence of noise in the pressure measurements.

The pressure sensor may be positioned in the horizontal portion of the conduit. The pressure sensor may be positioned immediately upstream of the valve, e.g. within a distance (in a direction parallel to the axis of the conduit) that is less than the diameter of the conduit.

The pressure sensor may be configured to obtain further measurements of the pressure of the flow of urine through the conduit. The pressure sensor may be configured to obtain measurements of the pressure continually, e.g. at regular intervals. The pressure sensor may be configured to obtain measurements at a substantially regular frequency.

Where the valve is arranged to be actuated between the first open configuration and the second restricted configuration repeatedly, e.g. at a substantially regular frequency, the pressure sensor may be configured to repeatedly obtain measurements of pressure when the valve is in the first open configuration and the second restricted configuration, e.g. at substantially the same frequency. Therefore, the pressure sensor may be configured to measure the pressure of the flow of urine through the conduit whenever the valve is in the first or second configuration.

In embodiments where the valve is arranged to be actuated between the first and second configuration repeatedly over the course of a user's urination session, this allows multiple repeat readings to be taken per void. This improves the time resolution of the bladder pressure measurement.

In embodiments where one or more further pressure sensors are provided downstream of the valve, the pressure sensor upstream of the valve and the one or more pressure sensors downstream of the valve may be used to determine a pressure differential across the valve. This pressure differential may be used to determine an indication of the user's bladder pressure and/or a flow rate or flow resistance of the user's urinary system.

Thus the one or more further pressure sensors downstream of the valve are preferably arranged to obtain a first measurement of the pressure in the conduit when the valve is in the first open configuration and to obtain a second measurement of the pressure in the conduit when the valve is in the second restricted configuration. Preferably the data recorder and/or the data transmitter is arranged to record and/or transmit data representative of these (first and second) measurements (and other data as is suitable and desired).

In embodiments when the device comprises one or more further pressure sensors, each of the plurality of pressure sensors may be arranged at a different position upstream or downstream of the valve.

The one or more pressure sensors may be arranged to obtain one or more further measurements of pressure. The one or more further measurements of pressure may be taken when the valve is in one or more of a plurality of further configurations. The one or more pressure sensors may be arranged to obtain measurements of pressure continually, e.g. at intervals. In some embodiments, the device may be configured to conduct a differential analysis to determine the flow resistance and bladder pressure over time continuously, rather than at finite intervals.

One or more (e.g. all) of the flow rate of urine through the conduit (which thus provides an indication of the flow rate of urine from the user's urinary system), the flow resistance of the user's urinary system and the bladder pressure of the user's urinary system may be determined in any suitable and desired way. In some embodiments one or more (e.g. all) of the flow rate of urine, the flow resistance of the user's urinary system and the bladder pressure of the user's urinary system are determined using the first and second pressure measurements (taken upstream of the valve).

When pressure sensors downstream of the valve are provided, one or more (e.g. all) of the flow rate of urine, the flow resistance of the user's urinary system and the bladder pressure of the user's urinary system may be determined using the corresponding differential pressure measurements (i.e. using the first and second pressure measurements taken upstream and downstream of the valve).

The change in height of the flow of urine when a user urinates into the device (e.g. determined by the first position sensor) may be used (e.g. in combination with the pressure measurements to first determine the total pressure head of the flow) to determine one or more (e.g. all) of the flow rate of urine, the flow resistance of the user's urinary system and the bladder pressure of the user's urinary system.

The extent to which the valve acts to restrict the flow of urine through the conduit (e.g. determined by the second position sensor) may (e.g. alternatively or additionally) be used to determine one or more (e.g. all) of the flow rate of urine (e.g. through the valve), the flow resistance of the user's urinary system and the bladder pressure of the user's urinary system.

In one set of embodiments, the flow rate of urine (e.g. through the valve) is determined first and then used to determine one or both of the flow resistance of the user's urinary system and the bladder pressure of the user's urinary system.

As outlined above, one or more of the flow rate, the flow resistance and the bladder pressure may be determined at (e.g. each of) a plurality of times (discretely or continuously), e.g. by performing a differential analysis to determine the flow resistance and bladder pressure over time (discretely or continuously).

In one set of embodiments the flow rate is calculated (e.g. for a particular set of measurements taken using the device) using the equation $$Q = A_{\it eff} \sqrt{\frac{2p}{\rho}},$$

where $A_{\it eff}$ is the effective cross-sectional area of the aperture of the valve (e.g. in the first or second configuration of the valve), p is the measured pressure (upstream of the valve) and $\rho$ is the density of urine (which may be a predetermined value).

The flow rate is preferably calculated for each of the first and second configurations of the valve. The effective cross-sectional area of the aperture of the valve may be preset (e.g. prior to use) or may be determined from the measurements made by the second position sensor. The flow rate may be calculated iteratively.

In one set of embodiments, e.g. following calculation of the flow rate, the flow resistance (of the user's urinary system) is calculated (e.g. for a particular set of measurements taken using the device) using the equation $$R = \frac{p^{PC} - p^{O}}{[Q^{O}]^n - [Q^{PC}]^n},$$

where $p^{PC}$ is the (upstream) pressure measured when the valve is in the second (restricted) configuration, $p^{O}$ is the (upstream) pressure measured when the valve is in the first (open) configuration, $Q^{O}$ is the flow rate determined when the valve is in the first (open) configuration, $Q^{PC}$ is the flow rate determined when the valve is in the second (restricted) configuration, and n is a constant (that depends on whether the flow through the urinary system is laminar or turbulent). This value may be deduced empirically from correlation or by introducing a third restriction state to the restriction profile for the control valve. The flow resistance may be calculated using differential analysis of the pressure measurements and the determined flow rates.

In one set of embodiments, e.g. following calculation of the flow resistance, the bladder pressure (of the user's urinary system) is calculated (e.g. for a particular set of measurements taken using the device, e.g. for each time interval) using the equation $p_b = p - \rho g(z_1 - z_2) + Q^n R$, where p is the (upstream) pressure measured by the device (e.g. measured continuously or in both of the first and second configurations of the valve), $\rho$ is the density of urine (which may be a predetermined value), g is gravitational acceleration (a constant) and $z_1 - z_2$ is the vertical distance between the pressure sensor(s) and the base of the bladder of the user. This may be correlated with the vertical height of the conduit (e.g. determined from the measurements made by the first position sensor).

The bladder pressure may be calculated (e.g. using the above equation) using the pressure measured (and the associated calculated flow rate and flow restriction) when the valve is in the first (open) configuration or the second (restricted) configuration (or using measurements taken at any other suitable (e.g. intermediate) configuration and/or if using the pressure when measured continuously). It will be seen that, given the assumption that that the user's bladder pressure is constant between the different configurations of the valve, these should give approximately the same values for the bladder pressure.

The data recorder and/or the data transmitter may be arranged to receive data from the pressure sensor. The data recorder and/or data transmitter may be arranged to receive data from one or more further sensors (e.g. the first or second position sensors or one or more further pressure sensors).

The device may further comprise processing circuitry. The processing circuitry may be in data communication with the pressure sensor. The processing circuitry may be in data communication with one or more further sensors (e.g. the first or second position sensors or one or more further pressure sensors). The processing circuitry may be in data communication with the vacuum pressure sensor.

The processing circuitry may be configured to process the measurements obtained by the pressure sensor. The processing circuitry may be configured to process measurements obtained by one or more further sensors (e.g. the first or second position sensors or one or more further pressure sensors). The processing circuitry may be configured to determine a combined pressure value (e.g. an average, maximum, minimum etc.) obtained by the pressure sensor and/or the one or more further sensors. The processing circuitry may be configured to determine, from measurements obtained by the vacuum pressure sensor, whether a suitable seal has been formed between the user and the adaptor.

Thus, in one set of embodiments, the processing circuitry is configured to determine one or more (e.g. all) of the flow rate, the flow resistance and the bladder pressure, e.g. as outlined above. The processing circuitry may be configured to determine these metrics at (e.g. each of) a plurality of times (e.g. corresponding to each time interval, e.g. for each (e.g. set of) configuration(s) of the valve).

The processing circuitry may be configured to issue control signals to actuate the valve. In embodiments wherein the device comprises an actuator for actuating the valve, the processing circuitry may be configured to issue control signals to an actuator (e.g. to instruct the actuator) to actuate the valve. The processing circuitry may be configured (e.g. to instruct the actuator) to actuate the valve according to one or more restriction profiles.

The processing circuitry may be configured to determine an appropriate restriction profile according to the first and second measurements of pressure from the pressure sensor. The processing circuitry may be configured to make this determination using (e.g. according to) one or more measurements obtained by one or more further sensors (e.g. the first or second position sensor and/or one or more further pressure sensors).

Thus, the device may comprise feedback circuitry configured to communicate data between the pressure sensor(s) and the processing circuitry and to communicate control signals between the processing circuitry and the valve or the actuator. This allows the actuation of the valve to be controlled substantially in real-time in dependence on the first and the second pressure measurements.

In some embodiments the data transmitter is arranged to transmit data (e.g. captured by the one or more pressure sensors or processed by the processing circuitry) wirelessly, e.g. over a radio communications network.

The processing circuitry may be in data communication with the data recorder and/or the data transmitter.

In some embodiments, the device comprises a user interface. The user interface may comprise a display. The (e.g. display of the) user interface may be configured to provide a user of the device with instructions (e.g. for using the device). The user interface may be configured to indicate a status of the device. The user interface may be configured to indicate data representative of the first and the second measurements to the user.

In some embodiments the device further comprises an electrical power source, arranged to provide electrical power the electrical components of the device. In some embodiments, the electrical power source may comprise a cell or a battery. This has the advantageous effect of enabling the device to be portable or handheld, thereby increasing both the utility of the device and the ease with which it may be used.

While the pressure and flow measurement device of the present invention has been described above as suitable for measuring the bladder pressure, urinary flow rate or flow resistance of a user, the Applicant has appreciated that the device and the method themselves may be used for other applications and are thus novel inventive in their own right. Therefore, when viewed from a further aspect, the invention provides a pressure measurement device comprising:
a conduit for receiving a flow of fluid;
a valve actuatable between a first open configuration and a second restricted configuration that restricts the flow of fluid through the conduit;
a pressure sensor upstream of the valve, wherein the pressure sensor is arranged to obtain a first measurement of the pressure of the flow of fluid through the conduit when the valve is in the first open configuration and to obtain a second measurement of the pressure of the flow of fluid through the conduit when the valve is in the second restricted configuration; and
a data recorder and/or a data transmitter for recording and/or transmitting data representative of the first and the second measurements.

When viewed from a further aspect, the invention provides a method of operating a pressure measurement device, the device comprising:
a conduit for receiving a flow of fluid;
a valve actuatable between a first open configuration and a second restricted configuration that restricts the flow of fluid through the conduit;
a pressure sensor upstream of the valve, wherein the pressure sensor is arranged to measure the pressure of the flow of fluid through the conduit;
the method comprising:
actuating the valve between the first open configuration and the second restricted configuration;
obtaining from the pressure sensor a first measurement of the pressure of the flow of fluid through the conduit when the valve is in the first open configuration;
obtaining from the pressure sensor a second measurement of the pressure of the flow of fluid through the conduit when the valve is in the second restricted configuration; and
recording and/or transmitting data representative of the first and the second measurements.

Thus, the device may be used to measure the pressure of any suitable fluid source. The fluid may be a liquid or a gas. The device may comprise an adaptor for establishing fluid communication with a fluid source and the conduit of the device.

Features of any aspect or embodiment described herein may, wherever appropriate be applied to any other aspect or embodiment described herein. Where reference is made to different embodiments or sets of embodiments, it should be understood that these are not necessarily distinct but may overlap. For example, the device may comprise a pressure sensor downstream of the valve. This may be suitable when the downstream pressure is not atmospheric, which helps to determine the differential pressure across the valve.

Preferred embodiments of the invention will now be described, by way of example only, with reference to the accompanying drawings in which.

Determining the bladder pressure of a user and/or a flow rate or flow resistance of the user's urinary system is an important diagnostic tool for determining the cause of LUTS. Embodiments of the present invention will now be described that are able to accurately determine such information.

Figure 1:
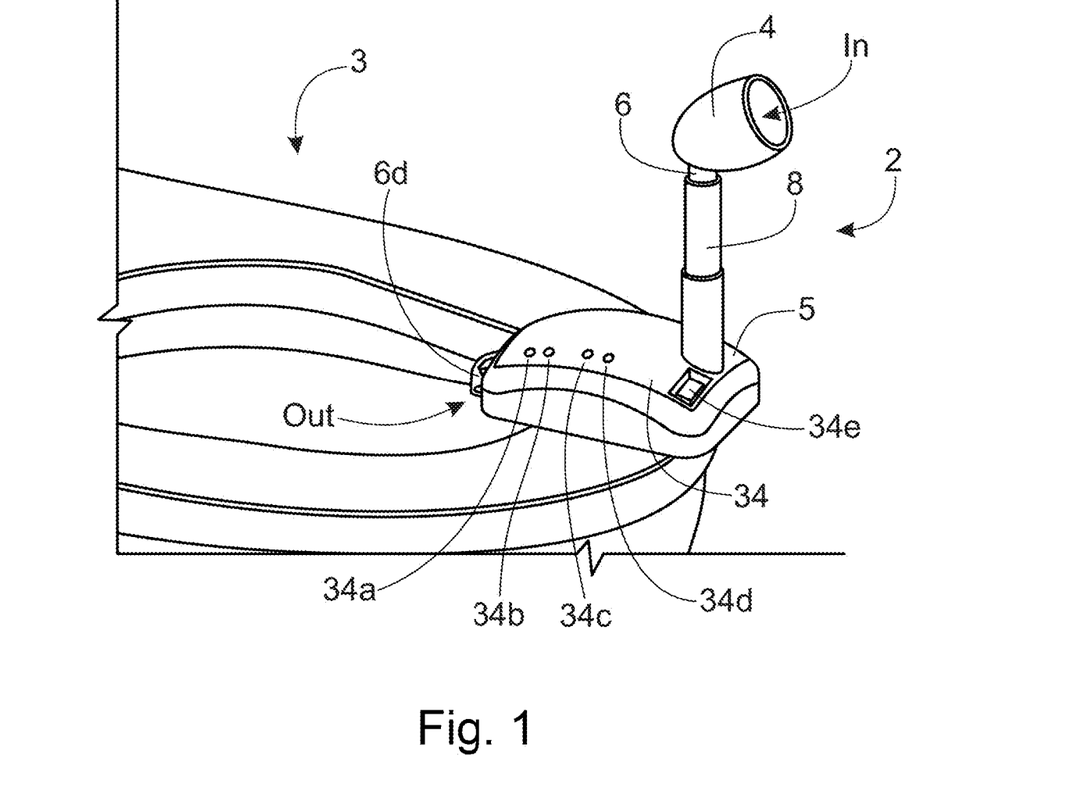
FIG. 1 shows a perspective view of a pressure and flow measurement device in accordance with an embodiment of the invention.

FIG. 1 shows a perspective view of a pressure and flow measurement device 2 in accordance with an embodiment of the invention. In the examples discussed below, the device 2 is configured to measure the bladder pressure and urinary flow rate of a male user. However, it will be appreciated that other embodiments of the present invention provide a device configured to measure bladder pressure and urinary flow rate of a female user.

The device 2 comprises a urethral adaptor 4, a housing 5, an extendable neck 8 and a conduit 6, extending from the urethral adaptor 4 through the extendable neck 8 and the housing 5.

The urethral adaptor 4 is arranged to receive a flow of urine. In the embodiment described below, the adaptor 4 is arranged to receive the penis of a male user. However, it will be appreciated that a suitable adaptor may be provided for receiving the vagina of a female user. The flow of urine is directed by the conduit 6 through the device 2 to an outlet portion 6d of the conduit 6. The device 2 is substantially compact, thereby allowing the device 2 to be arranged on the seat of a toilet 3 such that the outlet portion 6d is positioned above the bowl of the toilet 3. Thus, the flow of urine flowing out of the device 2 may flow directly into the bowl of the toilet 3, allowing it to be easily and safely disposed of.

The small size of the device 2 means that it may be used by the user in the privacy of the user's own home. This is in contrast to many state of the art devices which are complex and large in size, requiring a user to visit a secondary care facility in order to use the device. This increased ease of use allows multiple repeat readings to be taken easily, reduces the effects of performance anxiety in the user and eases the burden on care services.

The device 2 further comprises a user interface 34 arranged on an upper surface of the housing 5. The user interface 34 comprises a first 34a, second 34b, third 34c and fourth LED 34d and an ON/OFF switch 34e.

Figure 2:
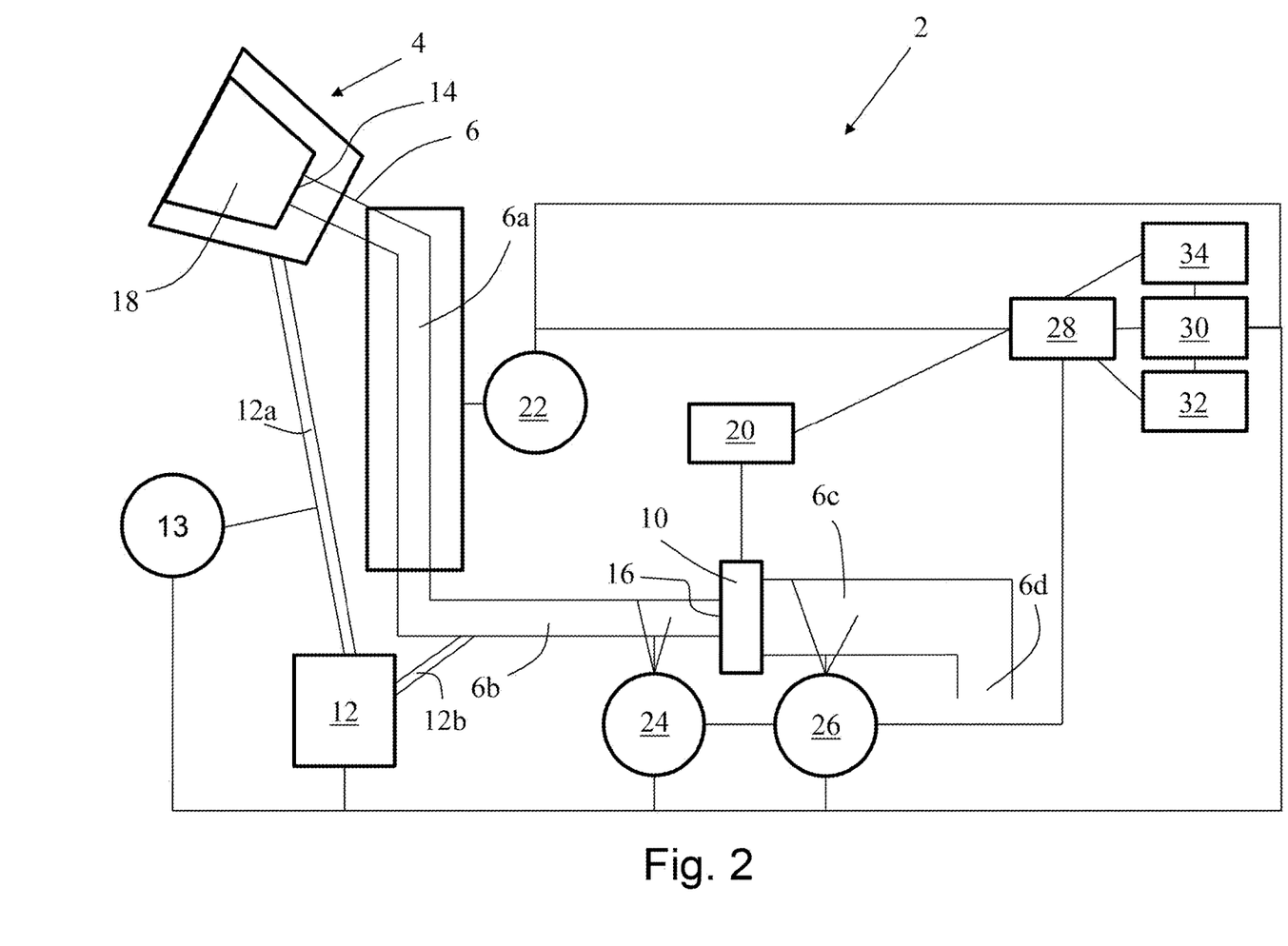
FIG. 2 shows a schematic of a pressure and flow measurement device in accordance with an embodiment of the present invention.

FIG. 2 shows a schematic of the pressure and flow measurement device 2 of FIG. 1.

As shown, the device 2 further comprises an iris control valve 10, a vacuum pump 12 and a vacuum pressure sensor 13.

The urethral adaptor 4 is conically shaped and defines a conical inner orifice 18, the distal end of which is in fluid communication with an inlet 14 of the conduit 6.

The conduit 6 further comprises a vertical portion 6a a first horizontal portion 6b, a second horizontal portion 6c and an outlet portion 6d. The first horizontal portion 6b extends perpendicularly from the lowermost downstream end of the vertical portion 6a such that the vertical portion 6a and the first horizontal portion 6b together define a right-angled corner.

The vertical portion 6a of the conduit 6 extends through the extendable neck 8 of the device 2. The extendable neck 8 may comprise telescopic components to enable the neck 8 to be shortened and lengthened by a user of the device 2. The urethral adaptor 4 is fixedly attached to the neck 8 such that the shortening or extending of the neck 8 respectively lowers or raises the adaptor 4. This allows the user to position the adaptor 4 at a height that is most convenient for the user.

The device 2 further comprises a position sensor 22, arranged on the extendable neck 8 to measure the vertical distance between the adaptor 4 and the first horizontal portion 6b of the conduit 6. In other embodiments, a pressure sensor is used to determine the vertical distance from a measured difference in gravitational head, as discussed above.

The iris control valve 10 is arranged at a first aperture 16 of the conduit 6, which is located at the downstream end of the first horizontal portion 6b of the conduit 6. The length of the first horizontal portion 6b is chosen to be twenty times greater than the diameter of the conduit 6. This helps to ensure uniform flow through the conduit 6 across the cross-section of the conduit 6. The diameter of the conduit 6, and thus the diameter of the first aperture 16, is chosen to be sufficiently narrow to ensure that the conduit 6 is always full but not to the extent that it induces a significant pressure drop.

The iris control valve 10, as will be described in more detail below, is movable between a first state and a second state. In the first state, the iris control valve 10 is arranged to predominantly open the aperture 16, thereby allowing fluid to flow through the aperture 16. In the second state, the valve 10 is arranged to partially close the aperture 16, thereby impeding the flow of fluid through the aperture 16.

The device 2 further comprises an actuator 20 for moving the control valve 10 between the first and second states. It will be appreciated that the actuator 20 may further be configured to move the control valve 10 to any number of intermediate states in which the aperture 16 is closed to various proportions.

Figure 4:
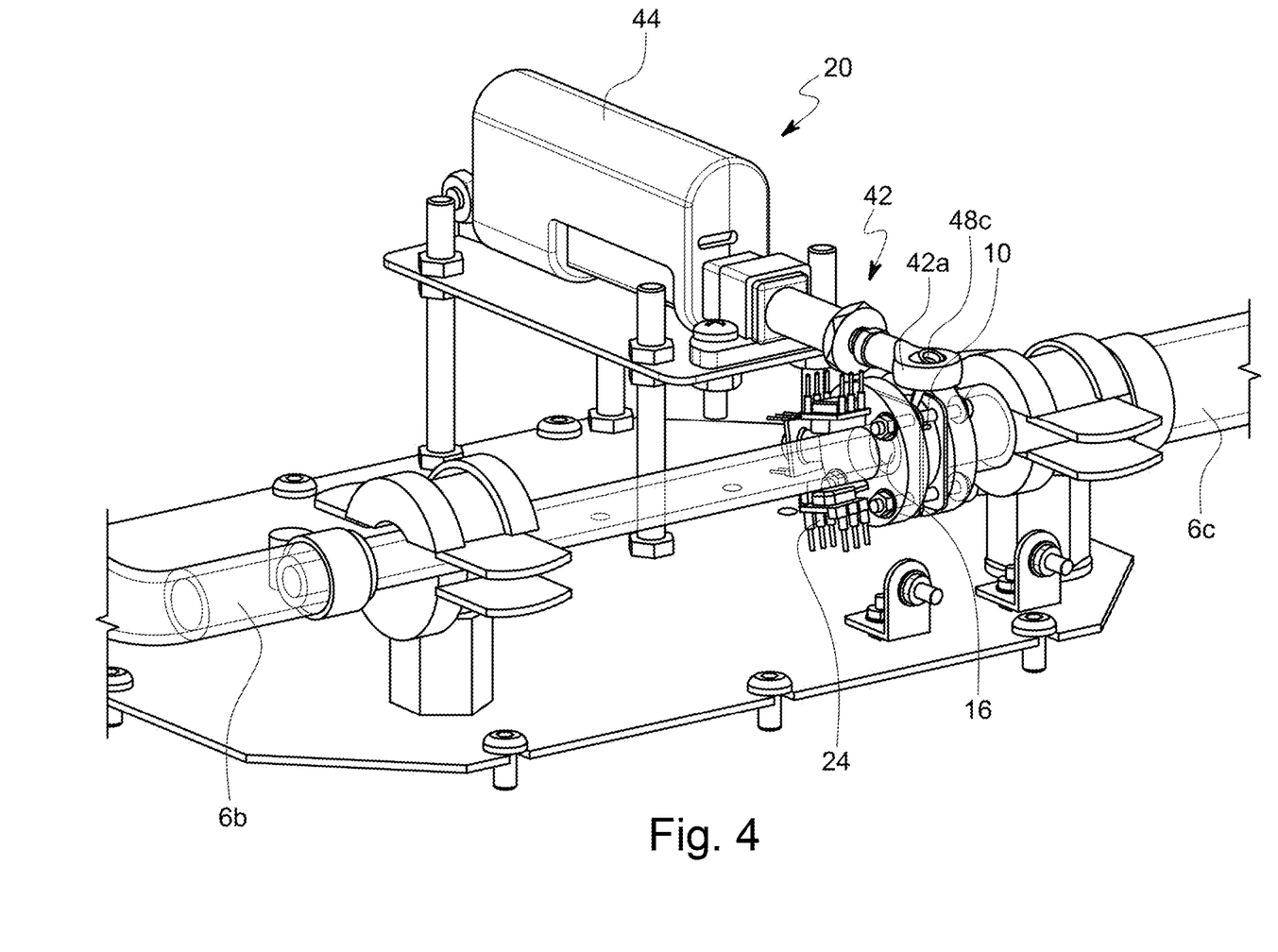
FIG. 4 shows a perspective view of a linear actuator for operating an adjustable restriction mechanism in a pressure and flow measurement device in accordance with an embodiment of the present invention.
Figure 5:
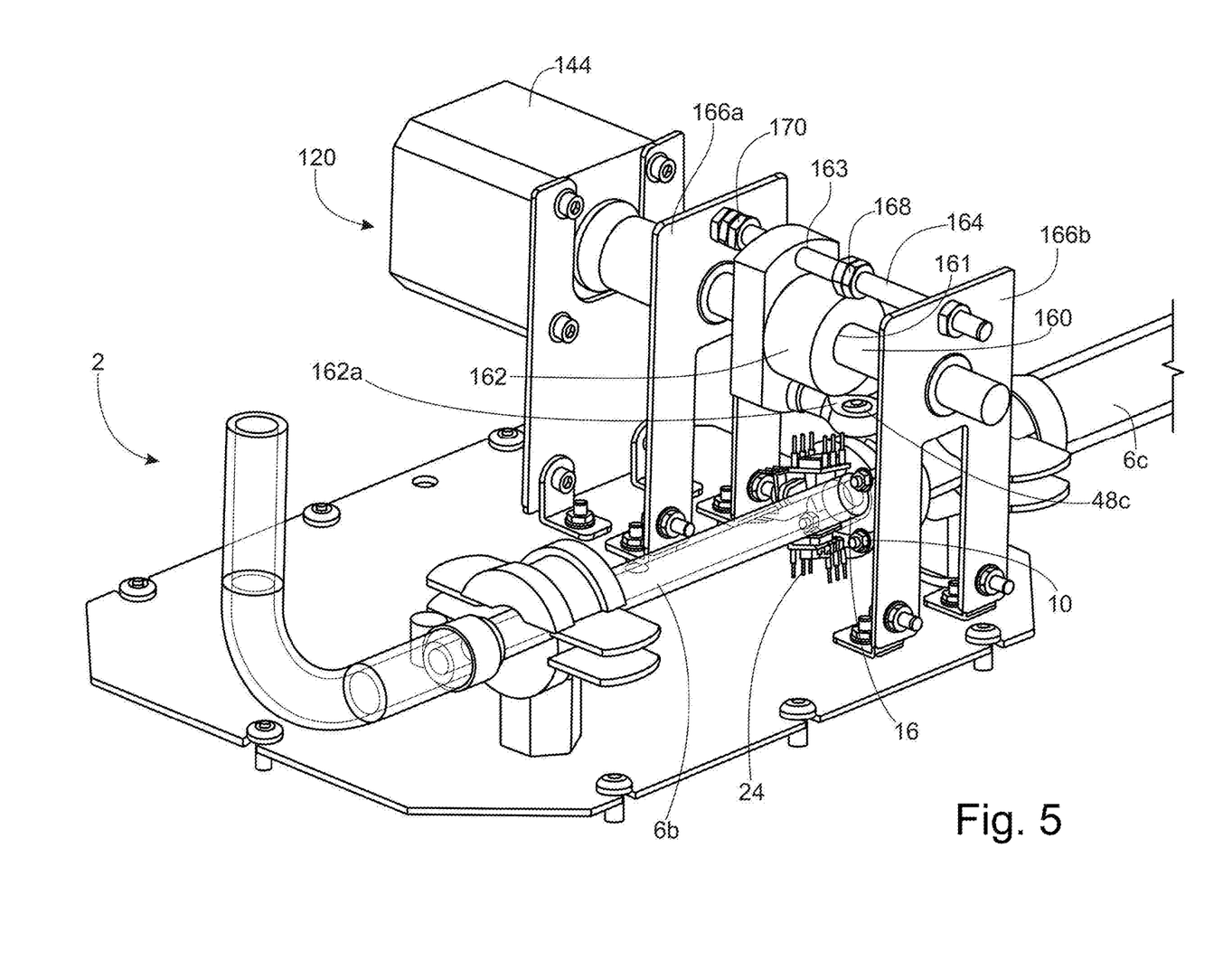
FIG. 5 shows a perspective view of a stepper motor for operating an adjustable restriction mechanism in a pressure and flow measurement device in accordance with an embodiment of the present invention.

The actuator 20 may be a linear actuator (as shown in FIG. 4), a stepper motor (as shown in FIG. 5), a servo motor, or any other suitable or desired actuator. The actuator 20 should be a fast response actuator, with little hysteresis (i.e. not affected by the direction of movement), as it is important for the control valve 10 to be precisely controlled so that bladder pressure and urinary flow rate may be accurately determined. The actuator 20 should also be chosen to be small and with a low power requirement.

The iris control valve 10 is provided with a position sensor (not shown), arranged to measure the extent to which the control valve 10 is arranged to restrict the aperture 16. This allows the rate of flow through the aperture 16 to be accurately determined.

The second horizontal portion 6c of the conduit 6 extends between the downstream side of the control valve 10 and the outlet portion 6d, thus providing fluid communication therebetween.

Figure 3:
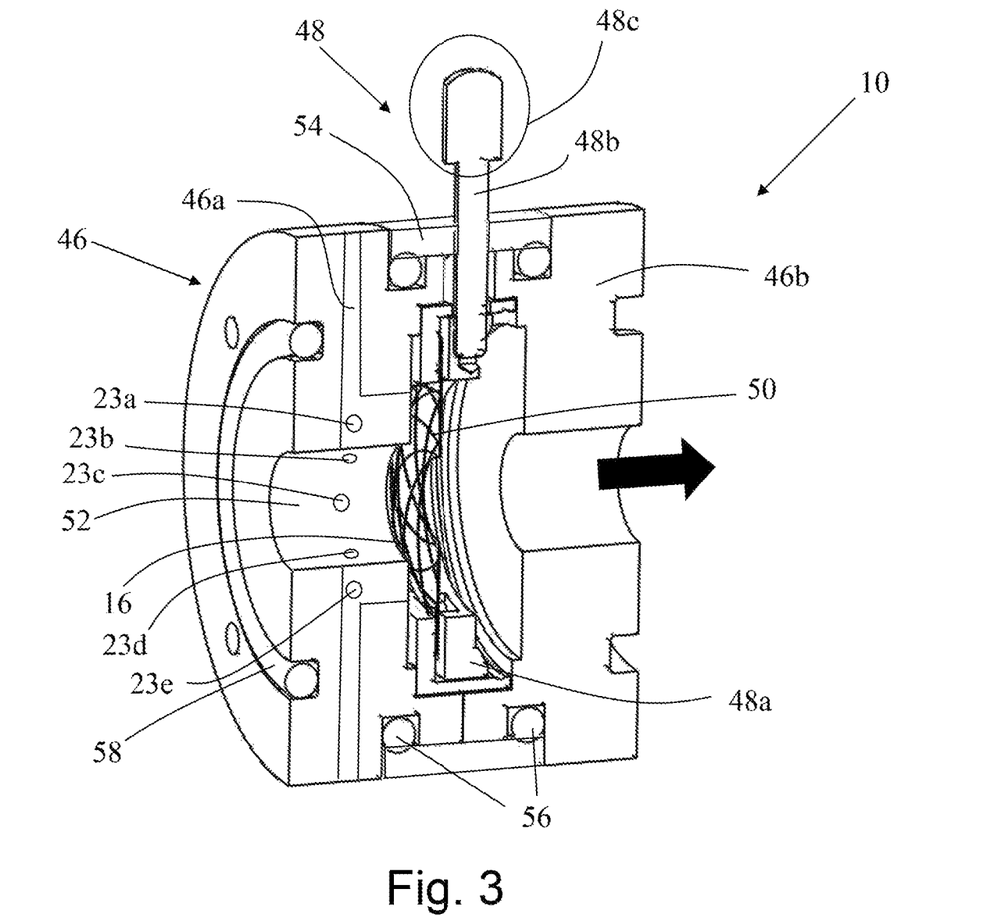
FIG. 3 shows a perspective view cross-section of an adjustable restriction mechanism in a pressure and flow measurement device in accordance with an embodiment of the present invention.

The device 2 further comprises a first 24 and second 26 array of pressure sensors, respectively arranged to measure the pressure upstream and downstream of the iris control valve 10. The first pressure sensor array 24 may be arranged in the first horizontal portion 6b of the conduit 6, immediately upstream of the control valve 10, and the second pressure sensor array 26 may be arranged in the second horizontal portion 6c of the conduit 6, immediately downstream of the control valve 10. The first 24 and second 26 pressure sensor arrays may instead be located within a housing 46 of the control valve 10 itself, as shown in FIG. 3.

In use, the device 2 is positioned such that the outlet 6d is located within, above, or otherwise in fluid communication with the bowl of a toilet 3 or another suitable receptacle, as shown in FIG. 1.

The device 2 further comprises a processor 28, a battery 30, a data recorder and transfer mechanism 32 and a user interface 34.

The processor 28 is configured to send control signals to the actuator 20 for controlling the operation of the actuator 20, e.g. to achieve a desired restriction profile for the control valve 10. The position sensor of the control valve 10 is configured to send data relating to the position of the control valve 10 (i.e. the extent to which the control valve 10 is arranged to restrict the flow through the aperture 16) to the processor 28. This data may be processed by the processor 28 to determine the flow rate through the aperture 16.

The processor 28 is further configured to receive pressure measurements from the first 24 and second 26 pressure sensor arrays and determine the change in pressure across the control valve 10 using the measurements obtained by the first 24 and second 26 pressure sensor arrays.

The processor 28 is further configured to receive distance measurements from the position sensor 22. In some embodiments, the processor 28 receives differential pressure measurements from the position sensor. These measurements are used to calculate the gravitational head of the fluid flowing through the device 2.

The processor 28 is configured to use the pressure measurements from the first 24 and second 26 pressure sensor arrays and the distance measurements from the position sensor 22 to calculate a flow rate of the fluid through the device 2 and a bladder pressure of the user of the device 2.

The battery 30 is arranged to provide electrical power to the position sensor 22, the first 24 and second 26 pressure sensor arrays, the actuator 20, the vacuum pump 12 and vacuum pressure sensor 13, the processor 28, the data recorder and transfer mechanism 32 and the user interface 34.

The data recorder and transfer mechanism 32 is electrically connected to the processor 28 and is configured to record data corresponding to the flow rate of the fluid through the device 2 and the bladder pressure of the user of the device 2 and transmit the data to a remote device or server (not shown). Thus, the device 2 may be configured to transmit this data to a clinician or other health care professional via the data recorder and transfer mechanism 32 so that the health of the user can be examined. For example, bladder pressure and urinary flow rate may be used to diagnose the causes of lower urinary tract symptoms (LUTS).

In operation, the device 2 is configured to receive a flow of urine from a standing male user of the device 2. The device 2 is powered on and positioned on the seat of a toilet 3 (as shown in FIG. 1), such that the outlet 6d of the device 2 is directly above the bowl of the toilet 3, thus allowing the flow of urine to flow directly from the outlet 6d of the device 2 into the toilet 3.

In order to activate the device 2, the user pushes the ON/OFF switch 34e on the user interface 34 of the device 2 (shown in FIG. 1). The first LED 34a is configured to illuminate to inform the user that the device 2 has been activated. The second LED 34b is configured to subsequently illuminate to instruct the user to insert his penis into the orifice 18 of the adaptor 4.

The user may adjust the length of the extendable neck 8 so that the adaptor 4 is positioned at a comfortable height, e.g. at the height of the user's groin. The position sensor 22 is configured to measure the height of the extendable neck 8 and transmit this measurement to the processor 28.

The conical inner orifice 18 of the adaptor 4 is arranged to receive the tip of the user's penis such that an inner surface of the adaptor 4 forms a seal between an outer circumference of the penis and the environment. This establishes fluid communication between the urethra of the user and the inlet 14 of the conduit 16, ensuring that, once the user begins to urinate, there is no leakage of urine to the environment. Furthermore, this helps to ensure that a steady, uninterrupted flow of urine is received at the inlet 14 of the conduit 16 and passed through the vertical portion 6a and the first horizontal portion 6b of the conduit 6.

The processor 28 may determine from pressure measurements received from the first 24 and second 26 pressure sensor arrays, and/or from the vacuum pressure sensor 13, that the user's penis has been inserted into the adaptor 4 and that a sufficient seal has been formed. The third LED 34c is then configured to illuminate to instruct the user to begin urination and the processor 28 simultaneously issues a control signal to the actuator 20 of the iris control valve 10. In response to the control signal, the actuator 20 actuates the control valve 10 according to a predetermined restriction profile that varies the extent to which the control valve 10 opens and closes the aperture 16 over time. For example, the control valve 10 may be rapidly pulsed between a predominantly open state and a partially closed state.

Once the user begins to urinate, the user's urine passes sequentially through the vertical portion 6a of the conduit 6 and the first horizontal portion 6b of the conduit.

The flow of urine through the aperture 16 is impeded by the iris control valve 10 to an extent dependent on the restriction state of the valve 10. In this way, the flow rate of the flow of urine through the aperture 16 is varied over time by the control valve 10.

The first 24 and second 26 pressure sensor arrays respectively measure the pressure of the flow immediately upstream of the control valve 10 and immediately downstream of the control valve 10. These measurements are transmitted from the first 24 and second 26 pressure sensor arrays to the processor 28.

The processor 28 is configured to use the distance measurement provided by the position sensor 22 and the pressure measurements provided by the first 24 and second 26 position sensor arrays to determine the flow rate of the urine and the bladder pressure of the user. This determination is discussed in more detail below with reference to FIGS. 6a and 6b.

The vacuum pump 12 is arranged outside the conduit 6 and comprises a first tube 12a and a second tube 12b. The first tube 12a connects the vacuum pump 12 and the orifice 18 of the adaptor 4. Thus, the vacuum pump 12 is arranged, when the device 2 is powered on and ready for use, to provide suction in the orifice 18 via the first tube 12a. This helps to ensure that a sufficiently tight seal is established when the user positions the adaptor 4 around their penis or vagina before commencing urination.

The vacuum pressure sensor 13 is arranged to measure the pressure of the vacuum within the first tube 12a. During use of the device 2, the pressure sensor 13 is arranged to transmit one or more pressure measurements to the processor 28, which may determine from the pressure measurements whether an effective seal has been formed between the adaptor 4 and the user's penis or vagina. The processor 28 may issue control signals to the user interface 34 in dependence on this determination to instruct the user to adjust their position or to confirm successful sealing.

The second tube 12b connects the vacuum pump 12 and the horizontal portion 6b of the conduit 6, at a tapping point upstream of the control valve 10. Thus, the vacuum pump 12 is further arranged such that, before the start of the test, the vacuum pump 12 may be used to evacuate air from the conduit 6. This removes the risk of bubbles in the conduit 6 affecting the pressure measurements taken by the device 2. In order for this evacuation to take place, while the adaptor 4 is sealed around the user's penis or vagina, the control valve 10 is closed fully to completely close the aperture 16. This creates a sealed volume within the conduit 6. The pressure within this sealed volume may be measured by the first pressure sensor array 24. Pressure measurements may be transmitted to the processor 28 during this evacuation process and used to determine when the process has been completed. Once the sealed volume has been evacuated by the vacuum pump 12 and the user has started to urinate, the vacuum is removed.

The diameters of the second horizontal portion 6c and the outlet 6d are larger than the diameter of the first horizontal portion 6b of the conduit 6 in order to minimise the pressure drop between the second horizontal portion 6c and atmosphere. Therefore, in contrast to the first horizontal portion 6b, the second horizontal portion 6c is not necessarily full of fluid during normal operation of the device 2.

FIG. 3 shows a perspective view cross-section of the iris control valve 10 of FIG. 2.

The iris control valve 10 comprises a housing 46, an actuator 48 and a plurality of overlapping aperture leaves 50.

The actuator 48 comprises an annulus 48a, an armature 48b and a spherical bearing 48c. The spherical bearing 48c is arranged at the distal end of the armature 48b. The armature 48b is approximately 3 mm in diameter. The proximal end of the armature 48b is fixedly attached to the outer surface of the annulus 48a such that the armature 48b extends radially from the annulus 48a.

The housing 46 defines a central bore 52, thus defining the first aperture 16 of the conduit 6 (as shown in FIG. 2), and comprises an upstream component 46a and a downstream component 46b. The actuator 48 is clamped tightly between the upstream component 46a and the downstream component 46b by threaded bolts (not shown) such that the centre of the annulus 48a is coaxial with the longitudinal axis of the central bore 52.

The actuator 48 is rotatable around the longitudinal axis of the central bore 52 of the housing 46.

The aperture leaves 50 are arranged circumferentially on the annulus 48a. The aperture leaves 50 are mounted to the annulus 48a by a pivoting point (not shown). This allows the aperture leaves 50 to be pivoted between a predominantly open position, in which each of the aperture leaves 50 extends in a substantially circumferential direction around the annulus 48a, and a partially closed position, in which each of the aperture leaves 50 extends in a substantially radial direction towards the centre of the annulus 48a, thus restricting the effective inner circumference of the annulus 48a and reducing the cross-sectional area of the aperture 16

The movement of the aperture leaves 50 is achieved by varying the circumferential position of the actuator 48 along an arc. This movement of the actuator 48 acts to drag the aperture leaves 50 between the predominantly open and partially closed positions. This has the effect of selectively opening and closing the aperture 16 respectively.

The upstream component 46a and a downstream component 46b of the housing 46 together define a circumferential groove that extends around an outer surface of the housing 46. An annular sheath 54 is located within the circumferential groove and defines a hole through which the armature 48b is arranged to extend. The diameter of the hole is substantially equal to the outer diameter of the armature 48b such that the sheath 54 is sealed around the armature 48b.

The annular sheath 54 is moveable around the circumference of the groove. The annular sheath 54 is made from low-friction PTFE to ease this circumferential movement. As the annular sheath 54 is sealed around the armature 48b, the sheath 54 is arranged to move with the armature 48b when the armature 48b is moved circumferentially.

O-rings 56 are provided between the lower surface of the sheath 54 and the outer surface of the housing 46. Thus, the sheath 54 and the O-rings 56 together provide a seal between the fluid flow path within the central bore 52 and the environment (in this case, the inside of the device 2).

Sealing rings 58 or gaskets are provided on the upstream surface of the upstream component 46a of the housing 46 (as shown in FIG. 3) and the downstream surface of the downstream component 46b of the housing 46 (not shown). The sealing rings 58 are arranged to provide a seal between the conduit 6 and the housing 46.

The upstream component 46a of the housing 46 defines a plurality of upstream pressure tapping points 23a-e at varying circumferential and axial locations around the central bore 52 of the upstream component 46a. The first pressure sensor array 24 comprises a plurality of pressure transducers (not shown), arranged in fluid communication with the upstream pressure tapping points 23a-e. Each pressure transducer is configured to determine a measurement of fluid pressure that is transmitted to the processor 28. The processor 28 is configured to determine (e.g. average) upstream pressure values according to a suitable combination of these measurements.

The downstream component 46b of the housing 46 defines a similar arrangement of pressure tapping points (not shown) that are arranged to receive the pressure transducers of the second pressure sensor array 26. The measurements transmitted from the second pressure sensor array 26 may be used by the processor 28 to determine (e.g. average) downstream pressure values. If it is assumed that the downstream pressure is substantially equal to atmospheric pressure, the second pressure sensor array 26 may be excluded.

Using a plurality of upstream and/or downstream pressure sensors provides the flexibility to obtain more reliable pressure measurements. The upstream 23a-e and/or downstream pressure tapping points may be positioned out of the direct flow of the fluid in order to reduce high frequency pressure components, i.e. noise.

FIG. 4 shows a close-up perspective view of a linear actuator 20 that is used to operate the iris control valve 10 shown in FIG. 3.

The linear actuator 20 comprises a housing 44, an actuator mechanism (not shown) located within the housing 44, and a piston 42. The housing 44 defines a cylindrical volume (not shown). The piston 42 is provided within the cylindrical volume and is moveable along the longitudinal axis of the cylindrical volume by the actuator mechanism to a maximum linear displacement of 13 mm.

The linear actuator 20 is located adjacent the iris control valve 10 such that the longitudinal axis of the cylindrical volume of the actuator 20 is perpendicular to the longitudinal axis of the conduit 6.

The piston 42 comprises a loop portion 42a located at the distal end of the piston 42. The loop portion 42a defines a central bore for receiving the spherical bearing 48c of the actuator 48. Thus, the linear movement of the piston 42, when the piston 42 is moved along the longitudinal axis of the cylindrical volume of the housing 44, is translated into the circumferential movement of the actuator 48. As described above, the circumferential movement of the actuator 48 serves to open and close the first aperture 16 of the conduit 6.

The linear actuator 20 is controlled by the processor 28 to open and close the aperture 16 at intervals according to a predetermined restriction profile.

In FIG. 4, the pressure sensor array 24 is arranged on the conduit 6, rather than within the housing 46 of the control valve 10, as shown in FIG. 3.

FIG. 5 shows a close-up perspective view of a stepper motor 120 that may be used to operate the iris control valve 10 shown in FIG. 3.

The stepper motor 120 is arranged to rotate a cylindrical threaded rod 160. The thread of the rod 160 is not shown in FIG. 5. The cylindrical threaded rod 160 is located adjacent the iris control valve 10 such that the longitudinal axis of the rod 160 is perpendicular to the longitudinal axis of the conduit 6. The rod 160 has a high thread pitch in order to increase the response of the stepper motor 120.

The rod 160 extends through a central bore 161 of an actuator 162. In this example, the actuator 162 is a lead screw. The central bore 161 of the actuator 162 is threaded such that it is complementary to the thread of the rod 160. The actuator 162 further defines a second, supplementary bore 163, located directly above the central bore 161 and arranged to receive a support rod 164. The support rod 164 is rigidly mounted to the device 2 via a proximal support stand 166a and a distal support stand 166b. Thus, the support rod 164 serves to prevent the rotation of the actuator 162 when the rod 160 is rotated. Instead, as a result of the complementary threads of the actuator 162 and the rod 160, rotation of the rod 160 causes the actuator 162 to be moved longitudinally along the length of the rod 160.

The actuator 162 further comprises a loop portion 162a, which is similar to the loop portion 42a shown in FIG. 4.

The loop portion 162a is arranged to surround the spherical bearing 48c of the actuator 48. Thus, the longitudinal movement of the actuator 162 along the length of the rod 160 causes the actuator 48 to rotated such that the iris control valve 10 is opened and closed, in the same way as described with reference to FIG. 3.

The support rod 164 comprises end stops 170, 168 arranged on the support rod 164 at a distance either side of the actuator 162, at a proximal and distal location respectively. The end stops 170, 168 limit the longitudinal distance that the actuator 48 can traverse, thereby limiting the length of the arc through which the actuator 48 is moved. The separation of the end stops 170, 168 may therefore be adjusted in order to modify the extent to which the aperture 16 can be opened or closed by the control valve 10.

The stepper motor 120 is controlled by the processor 28 to open and close the aperture 16 at intervals according to a predetermined restriction profile.

A spring (not shown) extends distally around the outer circumference of the rod 160, between the actuator 162 and the distal support stand 166b. The spring serves to reduce hysteresis such that the effective area of the aperture 16 is independent of the direction of travel of the actuator 162, i.e. whether the aperture 16 is being opened or closed by the control valve 10.

Distal pressure can be evaluated by quickly pulsing or varying a downstream restriction. Therefore by measuring how the flow rate changes as the restriction varies, the device 2 may be used to deduce the pressure in the bladder from fluid mechanics relations.

In FIG. 5, as in FIG. 4, the pressure sensor array 24 is arranged on the conduit 6 rather than within the housing 46 of the control valve 10, as shown in FIG. 3.

Figure 6A:
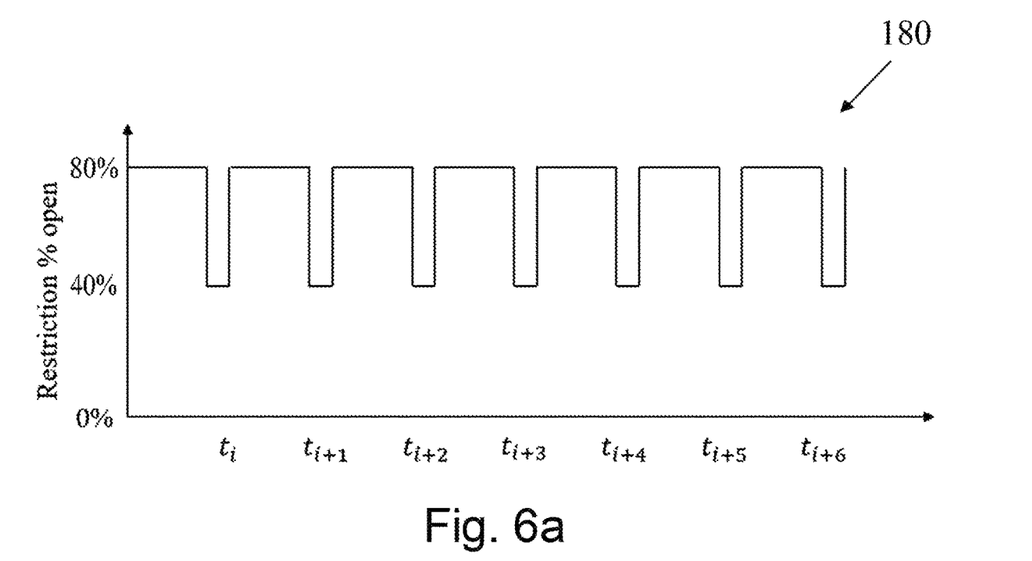
FIGS. 6a and 6b show plots of exemplary restriction profiles for an adjustable restriction mechanism in a pressure and flow measurement device in accordance with an embodiment of the present invention.
Figure 6B:
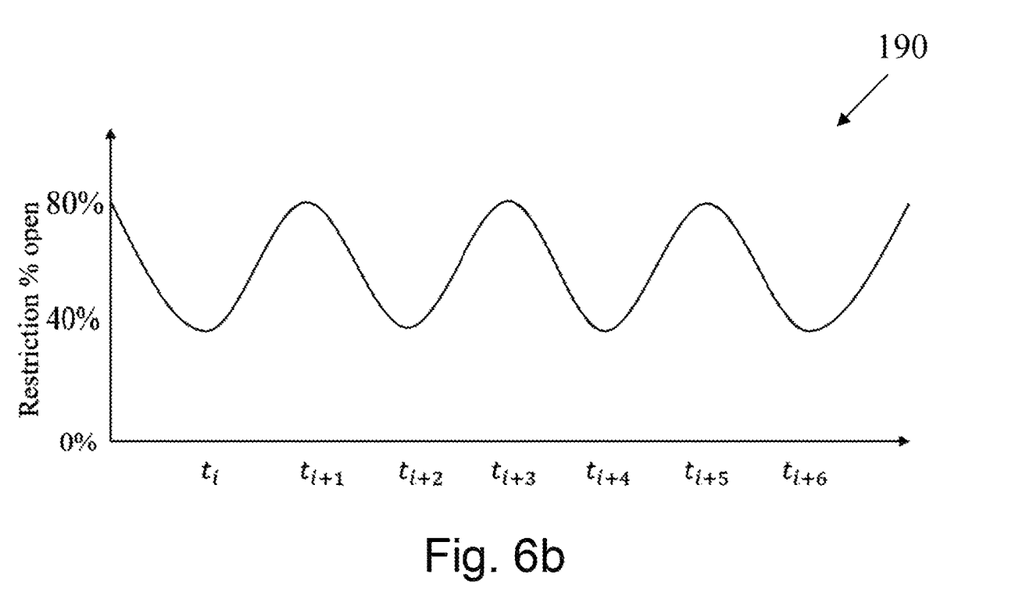

FIGS. 6a and 6b show plots of exemplary restriction profiles for the iris control valve 10 of FIGS. 2-5.

FIG. 6a shows a binary restriction profile 180, in which the valve 10 is periodically and abruptly moved between a total of two distinct states; a predominantly open state, in which the aperture 16 is 80% open, and a partially closed state, in which the aperture 16 is around 40% open. The diameter of the aperture 16 in the partially closed state may be around 3 mm. In the predominantly open state, the diameter of the aperture 16 is slightly smaller than the inner diameter of the conduit 6. This ensures that a sufficient pressure drop is induced to obtain accurate measurements of the flow through the aperture 16.

A control signal communicating the restriction profile 180 is transmitted to the actuator 20 from the processor 28. The actuator 20 responds to the control signal by operating the control valve 10 accordingly.

As can be seen in FIG. 6a, the control valve 10 is moved to the partially closed state at time intervals $t_i$, $t_{i+1}$, $t_{i+2}$, $t_{i+3}$, $t_{i+4}$, $t_{i+5}$ and $t_{i+6}$. The control valve 10 remains in the partially closed state for 200 ms, after which the control valve 10 is moved to the open state. The control valve 10 remains in the predominantly open state for 800 ms, after which the control valve 10 is moved back to the partially closed state. Thus the frequency of the control valve 10 in this example is 1 Hz. However, different frequencies may be selected in order to achieve a desired pressure difference between the predominantly open and the partially closed states. Once this cycle has been initiated by the processor 28, it is repeated until the processor 28 issues a termination signal to end the operation of the actuator 20.

FIG. 6b shows a sinusoidal restriction profile 190, in which the valve 10 is gradually and continuously moved between a predominantly open state and a partially closed state. This is in contrast to the restriction profile 180 shown in FIG. 6a, in which the movement between states is abrupt.

As can be seen in FIG. 6b, the control valve 10 is moved between the partially closed state (at time intervals $t_i$, $t_{i+2}$, $t_{i+4}$ and $t_{i+6}$) and the predominantly open state (at time intervals $t_{i+1}$, $t_{i+3}$ and $t_{i+5}$). Once this cycle has been initiated by the processor 28, it is repeated until the processor 28 issues a termination signal to end the operation of the actuator 20.

The processor 28 may issue the termination signal when a predetermined amount of time has elapsed, when a sufficient amount of data has been provided by the first 24 and second 26 pressure sensors arrays, or when the processor 28 determines from the data recorded by the first 24 and second 26 pressure sensors arrays that the user has stopped urinating, i.e. that there is no flow of urine through the conduit 6. The fourth LED 34d is configured to illuminate upon issuance of the termination signal by the processor 28 to inform the user that measurement has been completed.

At each time interval $t_i$, $t_{i+1}$, $t_{i+2}$, $t_{i+3}$, $t_{i+4}$, $t_{i+5}$, $t_{i+6}$ etc., the processor 28 is configured to receive at least two measurements, $p_u^O$, $p_u^{PC}$, of the pressure upstream of the iris control valve 10 from the first pressure sensor array 24, where $p_u^O$ is the pressure when the valve 10 is in the predominantly open state and $p_u^{PC}$ is the pressure when the valve 10 is in the partially closed state.

These measurements are then used by the processor 28 to determine flow rates $Q^O$ and $Q^{PC}$, where $Q^O$ is the flow rate when the valve 10 is predominantly open and $Q^{PC}$ is the flow rate when the valve 10 is in the partially closed state. The flow rates $Q^O$ and $Q^{PC}$ are determined respectively according to the following equations:

$$Q^O(t) = A_{\text{eff}}^O \sqrt{\frac{2 p_u^O(t)}{\rho}} \quad (1)$$

$$Q^{PC}(t) = A_{\text{eff}}^{PC} \sqrt{\frac{2 p_u^{PC}(t)}{\rho}} \quad (2)$$

In equations 1 and 2, $A_{\text{eff}}$ is the effective cross-sectional area of the aperture of the control valve 10 and $\rho$ is the density of urine. The effective cross-sectional area $A_{\text{eff}}$ may be determined for the predominantly open and closed positions of the control valve 10. The values may be determined empirically prior to use and stored in a memory portion of the processor 28.

Equations 1 and 2 are solved iteratively by the processor 28.

For the restriction profile shown in FIG. 6a, it can be shown that the flow resistance $R(t_i)$ of the user's urinary system can be found from the following equation, if it is assumed that the resistance $R(t_i)$ is constant between the predominantly state and the partially closed state:

$$R(t_i) = \frac{p_u^{PC}(t_i) - p_u^O(t_i)}{[Q^O(t_i)]^n - [Q^{PC}(t_i)]^n} \quad (3)$$

In equation 3, n is a constant that depends on whether the flow through the urinary system is laminar or turbulent. This value may be deduced empirically from correlation or by introducing a third restriction state to the restriction profile for the control valve 10, as this would result in three different equations with three unknowns.

The processor 28 is configured to determine a value of flow resistance R at each time interval $t_i$, $t_{i+1}$, $t_{i+2}$, $t_{i+3}$, $t_{i+4}$, $t_{i+5}$, $t_{i+6}$ etc. using equation 3 above.

For a smooth, constantly varying restriction profile such as that shown in FIG. 6b, the flow resistance of the urinary system is found from a differential analysis of the flow and pressure data.

The processor is further configured to calculate the user's bladder pressure $p_b$ at each time interval using the following equation, if it is assumed that bladder pressure $p_b$ is constant between the predominantly open state and the partially closed state:

$$p_b(t) = p_u(t) - \rho g(z_1 - z_2) + Q^n R(t) \quad (4)$$

In equation 4, $\rho$ is the density of urine (which may be a predetermined value), g is gravitational acceleration (a constant) and $z_1 - z_2$ is the vertical distance between the first 24 and second 26 pressure sensor arrays and the base of the bladder of the user. In most cases, this can be correlated effectively with the vertical height of the conduit 6 (which is determined from the measurements made by the position sensor 22). The bladder pressure may be calculated (using the equation (4)) using the pressure measured (and the associated calculated flow rate and flow restriction) when the valve is in the first (open) configuration or the second (restricted) configuration (or using measurements taken at any other suitable (e.g. intermediate) configuration and/or if using the pressure when measured continuously).

The values of $R(t_i)$ and $p_b(t)$ are logged by the processor 28 and transmitted, via the data recorder and transfer mechanism 32, to a remote server for further processing and/or review by a clinician or other health care professional. The processor 28 may be configured to determine whether the collected data is useful (e.g. whether a sufficient number of measurements were collected or whether the measurements lie within certain predetermined thresholds). The processor 28 may only transmit data that is considered to be useful via the data recorder and transfer mechanism 32.

The changes in both the flow rate and the bladder pressure over the course of the user's urination may be considered in combination to provide a diagnosis of different possible urinary conditions.

The restriction profiles for the iris control valve 10 are chosen to restrict the flow by a suitable amount and for a suitable length of time to acquire accurate values of pressure and flow rate, whilst ensuring that the flow rate through the whole device 2 is not substantially limited. This helps to reduce the back pressure through the device, allowing a more accurate indication of bladder pressure to be determined and avoiding discomfort for the user.

It can be seen from the above that, in at least preferred embodiments, the invention provides a pressure and flow measurement device that may be used to determine a flow rate and flow resistance of a user's urinary system, as well as an indication of the user's bladder pressure. The use of a control valve operated to quickly vary a restriction in the flow allows such measurements to be taken without significantly interrupting the flow rate of the urination, thus helping to avoid a back pressure that can lead to inaccurate pressure measurements and an uncomfortable experience for the user.

The present invention serves to further improve the user's experience as use of the device is non-invasive and does not need to be performed in a hospital or clinic, but instead may be performed in private, e.g. in the user's home. The Applicant has appreciated that this increases the utility of the device and may mitigate the effects of shy bladder syndrome, which can render the user unable to urinate while under observation.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A bladder pressure measurement device comprising:
a conduit for receiving a flow of urine;
a valve actuatable between a first open configuration and a second restricted configuration that restricts the flow of urine through the conduit;
a pressure sensor upstream of the valve, wherein the pressure sensor is arranged to obtain a first measurement of the pressure of the flow of urine through the conduit when the valve is in the first open configuration and to obtain a second measurement of the pressure of the flow of urine through the conduit when the valve is in the second restricted configuration; and
a data recorder for recording and/or transmitting data representative of the first measurement and the second measurement;
wherein the valve is partially closed in the second restricted configuration; and
wherein the device comprises a pressure sensor downstream of the valve arranged to measure pressure in the conduit downstream of the valve.

2. The bladder pressure measurement device as claimed in claim 1, wherein the device comprises an adaptor for receiving a body part of a user of the device, wherein the adaptor comprises a chamber, defined by an inner perimeter of the adaptor, wherein the adaptor comprises a seal extending around the inner perimeter of the chamber for sealing with the body part of the user.

3. The bladder pressure measurement device as claimed in claim 1, wherein the valve is arranged to be repeatedly actuated between the first open configuration and the second restricted configuration with a regular frequency.

4. The bladder pressure measurement device as claimed in claim 1, wherein the valve is configured to remain in the first open configuration for a first period of time, the valve is configured to remain in the second restricted configuration for a second period of time, and wherein the valve is configured to be actuatable between the first open configuration and the second restricted configuration according to a particular ratio of the first period of time and the second period of time.

5. The bladder pressure measurement device as claimed in claim 1, wherein the valve is actuatable between the first open configuration and the second restricted configuration to restrict the flow through the conduit over time according to a restriction profile, wherein the restriction profile comprises a stepped restriction profile, a sinusoidal restriction profile, a triangular restriction profile or a trapezoidal restriction profile.

6. The bladder pressure measurement device as claimed in claim 1, wherein the valve is configured such that the flow of urine through the valve is symmetrical about an axis of the conduit.

7. The bladder pressure measurement device as claimed in claim 1, wherein the valve comprises an armature operable to actuate the valve between the first open configuration and the second restricted configuration, wherein the armature is pivotally operable in a plane perpendicular to an axis of the conduit.

8. The bladder pressure measurement device as claimed in claim 1, wherein the device comprises a second position sensor configured to:
   obtain a sequence of measurements indicative of the extent to which the valve acts to restrict the flow of urine through the conduit; and
   correlate the sequence of measurements with template data representative of an expected sequence of measurements corresponding to a restriction profile.

9. The bladder pressure measurement device as claimed in claim 1, wherein the valve is arranged to be actuated between the first open configuration and the second restricted configuration repeatedly and the pressure sensor is configured to repeatedly obtain measurements of the pressure of the flow of urine through the conduit when the valve is in the first open configuration and the second restricted configuration.

10. The bladder pressure measurement device as claimed in claim 1, wherein the device comprises a stepper motor for actuating the valve between the first open configuration and the second restricted configuration.

11. The apparatus of claim 1, wherein the valve is actuatable to restrict flow through the conduit over time according to a restriction profile that is updated according to one or more measurements obtained during use of the apparatus.

12. A bladder pressure measurement device comprising:
   a conduit for receiving a flow of urine;
   a valve actuatable between a first open configuration and a second restricted configuration that restricts the flow of urine through the conduit;
   a pressure sensor upstream of the valve, wherein the pressure sensor is arranged to obtain a first measurement of the pressure of the flow of urine through the conduit when the valve is in the first open configuration and to obtain a second measurement of the pressure of the flow of urine through the conduit when the valve is in the second restricted configuration; and
   a data recorder for recording and/or transmitting data representative of the first measurement and the second measurement;
   wherein the valve is partially closed in the second restricted configuration;
   wherein the conduit comprises a vertical portion and a horizontal portion downstream of the vertical portion; and
   wherein the device comprises a first position sensor arranged to determine the vertical distance between the horizontal portion of the conduit and an upstream end of the vertical portion of the conduit.

13. A bladder pressure measurement device comprising:
   a conduit for receiving a flow of urine;
   a valve actuatable between a first open configuration and a second restricted configuration that restricts the flow of urine through the conduit;
   a pressure sensor upstream of the valve, wherein the pressure sensor is arranged to obtain a first measurement of the pressure of the flow of urine through the conduit when the valve is in the first open configuration and to obtain a second measurement of the pressure of the flow of urine through the conduit when the valve is in the second restricted configuration; and
   a data recorder for recording and/or transmitting data representative of the first measurement and the second measurement;
   wherein the valve is partially closed in the second restricted configuration; and
   wherein the valve comprises an iris control valve comprising a plurality of overlapping leaves together defining a circular aperture.

* * * * *